United States Patent
Monachello et al.

(10) Patent No.: US 6,748,439 B1
(45) Date of Patent: Jun. 8, 2004

(54) SYSTEM AND METHOD FOR SELECTING INTERNET SERVICE PROVIDERS FROM A WORKSTATION THAT IS CONNECTED TO A LOCAL AREA NETWORK

(75) Inventors: David R. Monachello, Westlake Village, CA (US); Mark de Lange, West Hills, CA (US); Sean Finlay, West Hills, CA (US)

(73) Assignee: Accelerated Networks, Moorpark, CA (US)

( * ) Notice: Subject to any disclaimer, the term of this patent is extended or adjusted under 35 U.S.C. 154(b) by 0 days.

(21) Appl. No.: 09/370,105

(22) Filed: Aug. 6, 1999

(51) Int. Cl.[7] .............................................. G06F 15/16
(52) U.S. Cl. ..................... 709/229; 709/227; 370/352; 370/232; 340/825
(58) Field of Search ................................ 709/227–229, 709/203; 707/10; 705/32, 412; 725/1, 30, 99; 713/201, 156, 155; 370/232–234, 352; 455/432, 433; 340/810, 825; 379/230, 112.01, 201.03

(56) References Cited

U.S. PATENT DOCUMENTS

| | | | | |
|---|---|---|---|---|
| 5,682,325 A | * | 10/1997 | Lightfoot et al. | 340/825 |
| 6,023,698 A | * | 2/2000 | Lavey et al. | 707/10 |
| 6,108,330 A | * | 8/2000 | Bhatia et al. | 370/352 |
| 6,115,755 A | * | 9/2000 | Krishan | 370/351 |
| 6,151,629 A | * | 11/2000 | Trewitt | 709/225 |
| 6,243,379 B1 | * | 6/2001 | Veerina et al. | 370/389 |
| 6,243,451 B1 | * | 6/2001 | Shah et al. | 370/352 |
| 6,351,453 B1 | * | 2/2002 | Nolting et al. | 370/232 |
| 6,385,651 B2 | * | 5/2002 | Dancs et al. | 709/227 |
| 2002/0002615 A1 | * | 1/2002 | Bhagavath et al. | 709/227 |

* cited by examiner

Primary Examiner—Wen-Tai Lin
(74) Attorney, Agent, or Firm—Blakely, Sokoloff, Taylor & Zafman LLP

(57) ABSTRACT

A method for dynamically selecting a network service provider is disclosed. The method allows a user to select a default route for an internet connection in a network configuration having a local area network workstations coupled to the network, customer premises equipment and a central office. Multiple network service providers may be selected for an individual workstation. The method may include simultaneously connecting the workstation to the network service providers.

20 Claims, 6 Drawing Sheets

US 6,748,439 B1

SYSTEM AND METHOD FOR SELECTING INTERNET SERVICE PROVIDERS FROM A WORKSTATION THAT IS CONNECTED TO A LOCAL AREA NETWORK

BACKGROUND OF THE INVENTION

1. Field of the Invention

The invention relates generally to establishing a connection to a network service provider, and specifically to dynamically selecting a service.

2. Discussion of Related Art

In networking today, routers are used to route information throughout a network. These routers often use a router table which provides specific instructions as to what path to take to arrive at certain locations. The router tables often specify a default route that is used when another route is not specified. That is, when a message being transferred has an Internet Protocol (IP) address, the router takes the destination address from the header of the IP address and attempts to match the address to one stored in the router table. If a match exists, then the entry in the table having the matching address specifies the path to take for that message. If a match doesn't exist, then the default route is taken. The default route is usually the one taken when accessing an internet service provider or the internet at large.

Today, individual access to a high-speed backbone may occur using a Multi-Service Access Platform (MSAP). The MSAP enables service providers to offer services over a single access facility. Customers, using customer premises equipment (CPE), gain access to the MSAP, which is usually located at a central office.

If an individual wants to access the internet through a workstation (or other computer systems), which is a part of a local area network, the person must establish a connection with an internet service provider through the CPE and the MSAP. However, in a local area network, the service provider is the same for all users. An individual user cannot select a specific provider other than the previously designated provider for the local area network. Individual users may desire to select a specific provider for one or more of a variety of reasons, such as cost, speed, reliability and/or security. Thus, there is a need for allowing a user to be able to select an internet service provider or any network service provider.

SUMMARY OF THE INVENTION

A method for dynamically selecting a network service provider (NSP) is described. In one embodiment, the method includes presenting a list of at least one NSP and dynamically selecting a network service provider from the list.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
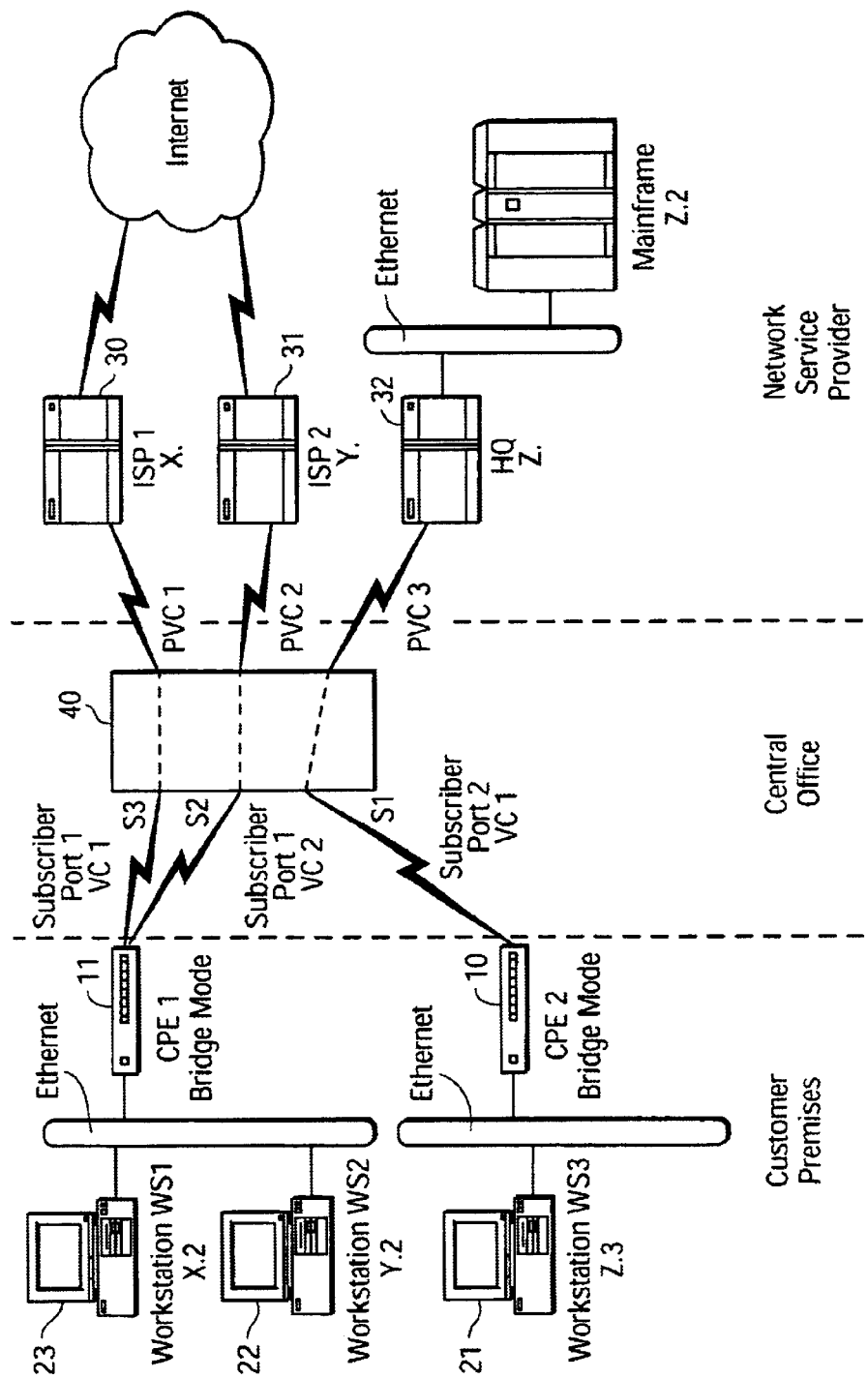
FIG. 1 is a block diagram of one embodiment of a system in which a workstation or other computer system may select a network service provider.

The dynamic service selection (DSS) described herein allows the user or group to select and use one or more Network Service Providers (NSPs). In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Overview

Dynamic service selection allows a user or group to select one or more network service providers (NSPs). In one embodiment, dynamic service selection comprises individual service selection or group service selection. Individual service selection allows each workstation user to select one or more NSPs, while group service selection designates one or more NSPs for all users in the group (e.g., all users of a customer premises equipment (CPE)). In one embodiment, dynamic service selection is advantageous in that the selection takes effect without requiring a reboot of the user workstation or the other network equipment. An NSP for purposes herein may be, for example, an Internet Service Provider (ISP), a company headquarters, or a content provider such as, for example, America Online or CompuServe.

FIG. 1 is a block diagram of a system in which dynamic service selection occurs. Referring to FIG. 1, customer premises equipment (CPE) 10 and 11 are coupled to one or more workstations 21–23 via networks. In one embodiment, these networks comprise Ethernet networks. Each of the workstations 21–23 may comprise a computer system or other processing device that may communicate with a CPE and an NSP through a local area network (LAN) to which the workstation is coupled. A user can gain access to one of NSPs 30–32 through one of workstations 23 and 22 coupled to the CPE 11 or workstation 21 coupled to CPE 10. The type of connection to the NSP depends on the configuration of the CPE.

CPEs 10 and 11 are configured by the central office (CO) 40, which maintains all the configuration information. The CO 40 maintains the NSP selection. Thus, CPEs 10 and 11 do not have to be configured with the NSP selection. Alternatively, multiple services may be available, and the CPEs 10 and 11 are able to select one NSP for all workstations in the case of group service selection or one NSP per workstation in the case of individual service selection. In one embodiment, the CPEs 10 and/or 11 may also allow selection of multiple NSPs per workstation.

The connection between a workstation and an internet service provider occurs through a CPE, which acts as a router. A multi-service access platform (MSAP) 40 may be located in the phone company central office.

In one embodiment, a web-based application may provide a graphical user interface (GUI), such as, for example, a web browser, for the user perform the service selection. The web browser may be part of a Java application which, when executed, displays a list of NSPs that the user is authorized to use. Using the web browser, the user selects an NSP. For example, if a particular end user decides he or she wants to get to the internet through America Online and another decides to do it through PSI Net, the individual end users may select the NSPs and essentially configure the system. In one embodiment, users may bring up an a Java application in a web browser.

In an alternative embodiment, the user selects more than one NSP or selects the NSP on an application by application basis. For Internet Protocol (IP), the application (network) layer examined to determine where to route information. In this manner, email may be transferred through one NSP, while Telnet is routed through another NSP. In one embodiment, the TCP or UDP header at the network layer is examined to determine to which NSP the particular traffic is to be routed. In an alternative embodiment, the user may discriminate between NSPs on a protocol by protocol basis (e.g., IP vs. IPX, IPX vs. Appletalk, etc.).

In response to the user's selection, the CPE obtains the list of services for that individual client is authorized to use. The list may be maintained by a directory service that is part of a central office (e.g., Multiple Service Access Platform (MSAP)). In one embodiment, the MSAP maintains a workstation ID that may be used to request the list of authorized NSPs maintained by the central office. In one embodiment, the workstation ID comprises the workstation MAC address. When selecting an NSP, the user makes the selection through an application and the CPE passes the information to the central office, which maintains a database of NSPs.

Once the list of NSPs has been obtained, the CPE presents the list to the user. The user makes a selection and the CPE obtains the user's choice. The CPE and CO make provisioning changes based on the selection. In one embodiment, when a selection occurs, a network connection is established from the CPE to the CO and from the CO to the NSP. Second, remote authentication occurs with the NSP to determine whether the user is allowed to use that service (e.g., determines whether the user is valid). Third, the global address parameters are acquired from the NSP or locally configured on the MSAP to be given to the CPE. This information is used for network address translation (NAT). In one embodiment, the CPE and CO performs all or some of these functions by executing software.

After the user selects one or more NSPs, the CPE maintains a table for the particular end user (or work station). One effect of the selection is a change in the default route for the user. For example, if the user of work station 21 selects America Online, then the default route for work station 21 is America Online. Similarly, if the user at work station 22 selected the route to headquarters, the default route for workstation 22 is headquarters. In one embodiment, the connection to headquarters may only be a more exact route to arrive at a more specific location (as opposed to the primary route to the NSP).

Thus, the DSS described herein is advantageous over standard routers in that it allows the user to decide which path will be used to arrive at a particular destination.

Figure 2:
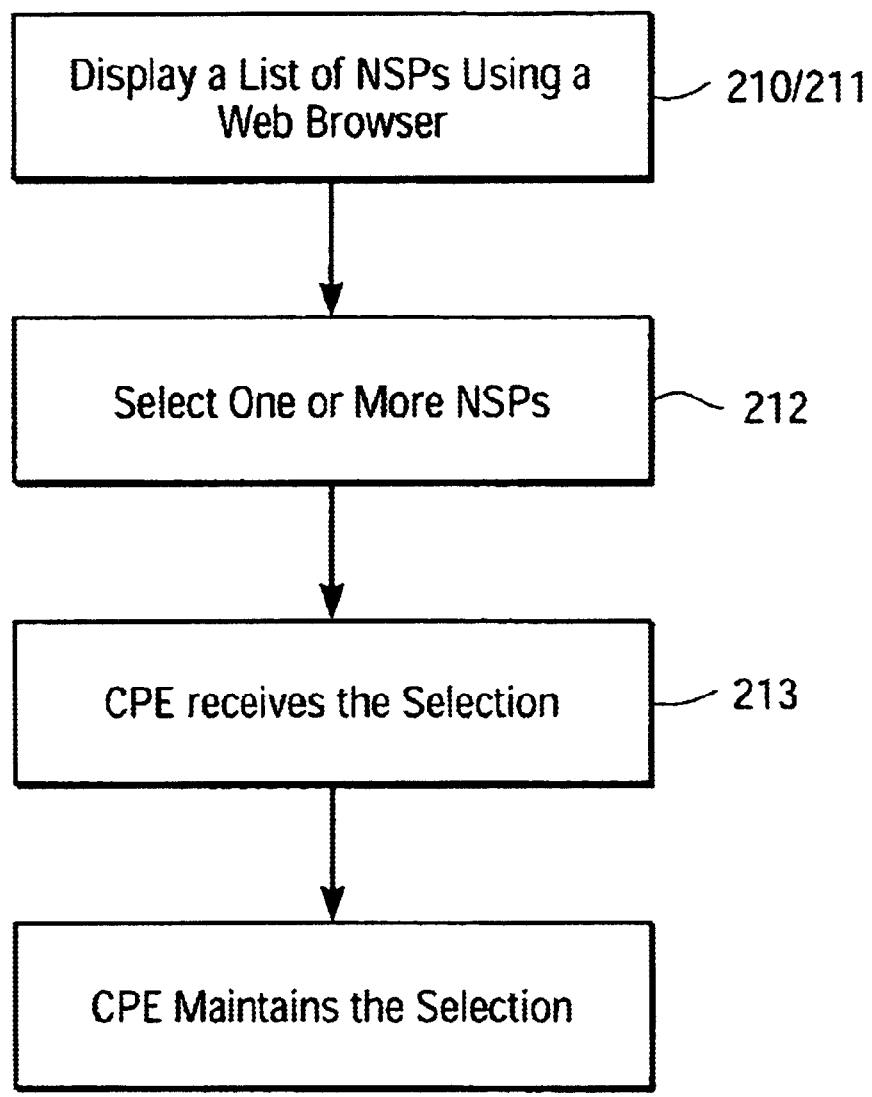
FIG. 2 is a flow diagram of one embodiment of a process for selecting a network service provider.

FIG. 2 illustrates one embodiment of a process for selecting a service dynamically. Referring to FIG. 2, initially a user displays a web browser (processing block 210). Then, a list of NSPs for which the end user has authorization to use is displayed (processing block 211). The user selects one or more NSPs from the list (processing block 212). The CPE receives the end users selection (processing block 213) and maintains the selection for the end user (processing block 214).

When using DSS, network address translation is used when a network's internal IP addresses cannot be used outside the network, either for privacy reasons or because they are invalid for use outside the network. In one embodiment, when using DSS, NAT mode or NAPT mode is used. NAT mode is a local to global address translation in which there is a one-to-one mapping between local addresses used on the LAN and global addresses used beyond the CPE. NAT is used to eliminate routing problems that can arise when switching NSPs and allows local workstations to efficiently communicate amongst themselves on their local LAN while also allowing them to communicate beyond the CPE through their selected NSP. NAPT, on the other hand, allows multiple local addresses used on the LAN to be mapped to a single global address used beyond the CPE. The locally unique IP address is only used to communicate between the user workstation and the CPE or CO box, whichever hosts the DSS mechanism.

In one embodiment, DHCP is used on the CO box to obtain an IP address. Each workstation can have a statically assigned locally significant IP address that may be used when the web application is run. After the service selection has been made, then a globally significant IP address is requested by a DHCP client on the CO if needed. When a connection occurs, the CO gives the CPE the address. The globally significant IP address may not be needed if the user has selected a bridged/private virtual LAN (VLAN) type of service. If a globally significant IP is required then the CPE tracks it in an locally significant to globally significant IP address map.

In an alternative embodiment, a DHCP server/proxy/relay on the CPE or CO box is used to obtain and distribute an IP address. The workstations are configured to use DHCP to acquire their IP address. When the workstation is booted, it sends a DHCP request for an address. The DHCP server running on the CPE will assign the workstation a temporary address. The user can now run the web based service selection application. When the user has made the service selection, the CPE forces the workstation to change its IP addresses from the temporary IP address to a globally significant IP address assigned by the selected NSP. Note that this removes the need for NAT.

The capability of service selection per workstation is mapped onto multiple virtual circuit connections between the CPE and CO. That is, if each workstation selects a service, then the CPE associates each workstation with the selected virtual circuit connection to the central office 40. For example, referring back to FIG. 1, CPE 11 forms virtual circuit connections 52 and 53 with central office 40, while CPE 10 forms virtual circuit connection 51 with central office 40. Thus, the link between the CPE and the CO is capable of multiple virtual circuits connections and each workstation has its own CPE to CO virtual circuit connection. Note the workstation ID can be discerned by the CPE from the protocol headers of the packets used to carry the configuration requests, which will be transparent to the end user.

Note that in one embodiment, when there are multiple workstations using the same CPE, if they select the same service, they are multiplexed onto the same virtual connection.

Once a default route has been selected, the CPE maintains a list of the end user's default NSP. The list is maintained in the CPE with an end station identifier (e.g., a MAC address, layer 2 address, layer 3 address, etc.). When the CPE receives a communication from a workstation, the CPE examines the end station identifier and determines if the end user's default NSP has been selected. If so, then the CPE retrieves stored information indicating how the virtual circuit connection is to be set up for that workstation. In one embodiment, there are three distinct ways in which the virtual circuit connection is determined, which are according to a specific non-default IP route, a protocol type, or a default.

The following tables describe the information kept in the CPEs for the network such as in FIG. 3 (described below).

| workstation | internal address | subscriber VC | service | entry type | table pointer | IP route destination | next hop | external address |
|---|---|---|---|---|---|---|---|---|
| ws1 | L.3 | 1 | ISP1 | IP route | | 0 | X.10 | X.2 |
| ws2 | L.2 | 3 | HQ-IP | IP route | | Z.0 | Z.10 | Z.1 |
| ws2 | L.2 | 2 | ISP2 | IP route | | 0 | Y.10 | Y.1 |

CPE 1 master table      CPE 1 IP table

| workstation | internal address | subscriber VC | service | entry type | table pointer | IP route destination | next hop | external address |
|---|---|---|---|---|---|---|---|---|
| ws3 | L.1 | 2 | HQ-IP | IP route | | Z.0 | Z.10 | Z.2 |
| ws3 | L.1 | 1 | ISP2 | IP route | | 0 | Y.10 | Y.2 |
| ws3 | L.1 | 3 | HQ-IPX | protocol type | | | | |

CPE 2 master table      CPE 2 IP table

| protocol type |
|---|
| 0x8137 |

CPE 2 protocol table

Packets are processed and forwarded based on the information in the master forwarding table and its associated protocol specific tables. A series of comparisons between the packet content and the table content will be made to find the best match. When the best match is attained, the virtual circuit (VC) that will carry the packet is determined and the packet will be forwarded on this VC.

The master table is the first table accessed when processing an incoming packet. The master table is similar to a bridge table since it is indexed by the workstation identifier. It is different from a bridge table in the following ways:

the source workstation identifier is used in the lookup multiple entries for the same workstation exist in the table the entries are not learned. They are inserted into the table from the service selection application the table entries may point to further more specific protocol entries Some fields in this table (some other fields are shown for descriptive purposes only) are the workstation ID, subscriber VC, entry type and table pointer.

The workstation ID is the primary key in the master table and is used to identify the list of entries that may be used to forward the packet. The order of the entries in the table is significant for entries with the same workstation ID. In one embodiment, the entries will be processed in the order that they appear in the table (e.g., early entries have higher priority) and the first entry which is a complete match will be chosen.

The subscriber VC is the virtual circuit between the CPE and CO which will be used to carry the traffic classified by this table entry. The entry type describes the table entry type that the table pointer points at and the code which should be used to process the entry.

The IP table contains information used to direct IP and ARP packets to their proper VC. This is essentially a IP route table that is specific to an end user. The IP table includes fields for the IP route destination, next hop, and external address, which are as follows:

IP route destination—this field is used to direct IP packets to their proper VC. The destination IP address in the packet is compared to this field after the subnet mask is applied;

next hop—this field is used to direct ARP requests to their proper VC. The workstation sends an ARP request for the next hop. This may be either the final destination if in the same subnet, or the router the workstation is using to reach the destination; and external address—this field is used if NAT is required by the subscriber to communicate with the specified service.

The protocol type table is used to handle protocol type entries and allows traffic of a specific protocol to be directed to a specified VC. In one embodiment, there is only one field in the protocol type table—the protocol type.

In one embodiment, the CPE makes bridging and IP routing decisions and the CO only switches the traffic to the NSP. The NSP equipment may bridge or route the traffic.

In another embodiment, multiple simultaneous sessions. FIG. 3 illustrates multiple sessions occurring. In this manner, a user can actually choose to have some of his or her traffic go in one direction and some of this traffic to go in other directions. For example, suppose a user decides to have his or her email sent through a connection with a service provider that is inexpensive but slow. The user wants his or her email to go through this provider because the provider is really cheap. However, for a video conference, the service connection may be very expensive, so the user will access this service only on occasion. In one embodiment, the user can, on a per application basis, determine the route different types of traffic. The user can select that his or her general traffic will go through a slow link, while determining that video conference traffic uses an expensive path with very good performance. Thus, DSS described herein may be used, not only per work station, but even on a per application basis, to allow a user to decide where the particular traffic path is for specific types of traffic.

Figure 3:
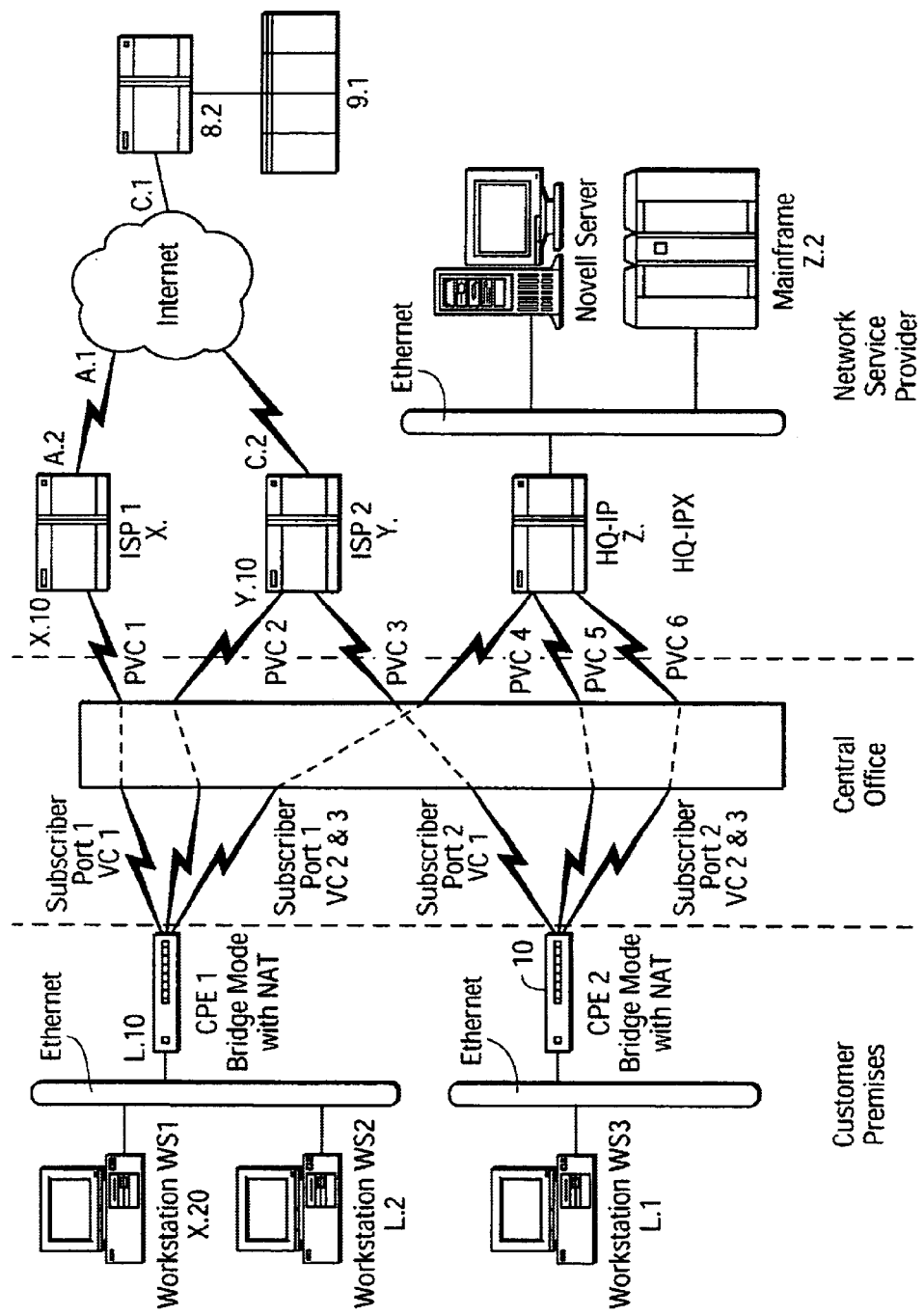
FIG. 3 is a block diagram of one embodiment of a system in which one workstation selects several network service providers.

FIG. 3 shows an embodiment where each workstation can have multiple simultaneous services. In one embodiment, the traffic is handled via a combination of layer 2 and 3 processing. The CO will do standard layer 2 switching. The NSP equipment may bridge or route the traffic.

There are two modes in which dynamic address assignment will work with this mode of service selection. When local/private IP addresses are used on the workstations, a DHCP server of the NSP assigns the dynamic IP address to the DHCP client on the CPE device. The local/private IP addresses may be either be static or handed out by a local DHCP server. When global IP addresses are used with DHCP, then the CPE and CO acts as relay agents to relay the real global address from the NSP to the workstation. If it is necessary for the workstation to communicate via IP before it gets a global address, such as when it runs the service selection mechanism, then the CPE gives the workstation a local/temporary IP address.

In one embodiment, the CPE uses NAT to translate the local/private IP addresses used in the CPE into global IP addresses. Referring to FIG. 3, workstation WS1 is using a single service with a global IP address assigned to it, workstation WS2 has two services, and workstation WS3 has three services. Workstations WS2 and WS3 are using local/private IP addresses. The CPE knows when to translate the addresses and which global IP address to use based on information from the central office. When user selects a service, all the connection information that is configured in the central office corresponding to that user utilizing that service is sent down from the central office to the CPE and forms a record that is used at runtime. The information may include, for example, the type of address translation, types of operation modes. In one embodiment, the connection is facilitated by subscriber and service applications described in greater detail below. Note that the term subscriber has been used to refer to a user in the context of the present invention.

Subscriber and Service Applications

Subscriber and Service Applications (SSAs) allow users to provision and configure both subscribers and services. This facilitates dynamic service selection because the SSA stores a list of services one can select and the subscriber profiles. Specifically, in one embodiment, a process for selecting a service comprises defining a subscriber, defining a service, and creating a connect that unites the two together.

The following description discloses one embodiment of a technique for associating the users and services. In this manner, a connection may be provided from multiple subscribers to multiple services over any given media.

Services are typically connected to the uplink interfaces (e.g., ATM, Frame relay, Ethernet, etc.) on a CO. Users of a workstations, or subscribers, are connected to the LAN side of a CPE, while the uplink side of the CPE is connected to a line card interface (e.g., xDSL, etc.) on a CPE or a CO.

In one embodiment, there are two subscriber service applications: an internal application and an external application. The internal application, SSA resides within the CPE or CO. The external application(s) is any external application, PC based, HTML or JAVA, which is used to provision, manage and connect a subscriber or service profile. A set of CLI commands is also supported to allow the user to configure the service and subscriber information directly into the CO.

A subscriber can have a number of different connection profiles. The profiles can be any one of the following (and others as they are defined): 1) direct Connection (nailed up) to NSP; 2) multiple NSP service option, subscriber makes all configuration changes manually when changing service; 3) multiple services with dynamic service selection; 4) there can be multiple subscribers attached to a given CPE device, each with a different connection profile; and 5) multiple services with dynamic service selection and the ability to go to multiple destinations simultaneously, this is a future feature.

As discussed above, a service is an end point on the uplink side of the network to which a subscriber wishes to connect. In one embodiment, the services include: 1) internet service providers; 2) transparent LAN service providers; 3) long distance carriers (both data and voice); 4) corporate headquarters (enterprise network); or 5) other data or voice service providers.

A subscriber connects to a service at an NSP. The service contains the Class of Service parameters which are used for the connection between the subscriber and the NSP. In effect the subscriber connects to a service and doesn't really see the NSP.

The CPE only contains information about active subscriber sessions. This information is handled by the CPE's Data (Voice) Connection Manager. In one embodiment, the configuration information for both a subscriber and a service reside on the CO. The CO includes a database that is queried on an as needed bases as connections are established.

Provisioning Subscribers and Services

The provisioning activity can be executed using the network management tools or the CLI.

A NSP definition contains specific information about a given network service provider. A number of services can be configured at any given NSP. Each service inherits some of the NSP's characteristics and adds service parameters. Thus, if different classes of service are provided by an NSP, a different service must be defined for each class of service. When a service is created initially, it will be assigned default values for the various class of service (traffic management and bandwidth parameters). The different classes of service can be described using the service description field. This field will be displayed to the subscriber during the service selection process. A subscriber connects to a service, or more accurately a subscriber connects to an authorized service, defining particular class of service parameters at an NSP.

In one embodiment, subscribers can be defined independent of NSPs and services; however, a subscriber cannot "go" anywhere until a connection, service and NSP exists. Similarly, a service definition can be created but no subscriber can connect to the service until it is attached or associated with a particular service.

A subscriber's definition contains information, with most of the actual connection information is contained in the connection table. When a subscriber and service have been created, the service associated with an NSP and the subscriber authorized to connect to the service, a connection entry can be created to connect the subscriber to the service. This is at least a two stage process, first the connection entry is created. If no changes to the default connection parameters are required, a connection operation can be performed to establish the connection end-to-end.

When a connection has been created, a connection statistics entry is created. The connection statistics entry contains information about the status of the connection, number of cells sent and received and any error counts.

Provisioning a Service

In order to provision a service, a service definition is created. In one embodiment, the service definition is created as a part of the subscriber-service configuration. The service defines the quality of service offered to the subscribers that are authorized to use this service. The service definition contains the Class or Service (including the Quality of Service (QoS) parameters). One embodiment of a service definition is as follows:

| | |
|---|---|
| Index: Unique Identifier (MIB use) | Name: A unique name and description for the service |
| Icon Location: The location in the file system of the ICON to display at the subscriber for this service | Authentication Type: RADIUS, None. |
| BWProfile: This is index to the profile which contains all the traffic management parameters like PCR, SCR, MBS, QosLevel. All the connections using this service are set up with these traffic management parameters. | MaxConns: Maximum number of connections the service can support. |
| Status: Used to create, delete, activate or de-activate the service definition. | |

In one embodiment, four QoS levels are defined which have different values of Cell Delay Variation, Cell Loss Ratio and Cell Transit Delay.

Provisioning a Service Reachability Entry

A service reachabiltiy entry defines the uplink ports on which the specified service is reachable. In one embodiment, there can be more than one reachabiltiy entry associated with any service which means that the connections to that service can be established over any of those ports. It is the responsibility of a traffic management module in the CO to determine which port to use for the connection. One embodiment of a service reachability entry is as follows:

| | |
|---|---|
| ServiceIndex: Index of the service to which this entry is attached. | Status: Used to create, delete, activate and deactivate the entry. |
| SSP(shelf, slot, port): Uplink port on which this service is reachable. These parameters are mandatory for the entry to become active. | |

Provisioning a Service Management Reachability Entry

A service management reachability definition contains information which is used to bring up IP management interface. This interface is used to send the authentication requests to the (RADIUS/LDAP) servers at the service provider's site. The remote authentication is typically required for individual subscribers that are using DSS application to connect to a service. An example of a service management reachability definition is as follows:

| | |
|---|---|
| Index: A Unique Index. | SSP: shelf, slot port. These parameters are mandatory for the entry to become active. |
| Management VC: VPI/VCI. These parameters are required if the uplink port is of type ATM. Not applicable in case of Ethernet uplink. | Connection Encaps.: For ethernet uplink, the value should be RFC1483-LLC-Bridge. For ATM uplink, its value should be RFC1483-LLC-IP. |
| Local IP Address: This parameter is mandatory for entry to become active. | Subnet Mask: (Optional). If not configured, it is set to natural mask value derived from local IP address. |

-continued

| | |
|---|---|
| Remote IP Address: This is required if the Radius server is on a different logical network. This becomes the next hop for the host route that is added to reach the server. | RADIUS Server: IP Address for the RADIUS authentication server |
| ConnectState: Indicates the state of the management connection between the CO or aggregator system and the service | Status: Used to create, delete and change the operational status of the entry |

Provisioning a Subscriber

In one embodiment, in order to provision a subscriber the following information can be configured.

| | |
|---|---|
| Password: dude | Name: The name has to be unique. |
| Local Authentication: Yes/No | Description: Born in Chicago |
| SSP: shelf, slot, port. Required only for group subscribers. For Individual subscribers these are supplied by DSS application. | Default Service: NSF |
| | No. of Connections: Number of connections configured. This is for informational purpose only. |

In one embodiment, the subscriber's name is unique. The authorized services for a subscriber are defined using the Authorization Table, described below. The subscriber's SSP or physical location is required if the subscriber's connection type is permanent. Permanent connections are re-established automatically, via the system when the conditions are appropriate, e.g. when the port is up and the selected service is active etc.

Each subscriber can have a different connection profile, depending on the type of physical port they are connected to and the protocols supported by the system. These connection profiles contains descriptions of the protocols and addressing which this subscriber will be configured to use. For example, if the subscriber will be using ATM, then the connection profile could be: ATM PVC or ATM SVC. The subscribers addressing field is defined on a per service basis. One service may be a PVC type whilst another may use SVCs.

If the connection is an Ethernet type, then the various Ethernet encapsulations would define different Ethernet connection profiles. If the connection profile is ATM PVC, then the address field needs to be filled out with the VPI and VCI for the PVC. For an IP connection profile the address field would be configured with an IP address and sub-net mask.

Connection Entry

A connection entry is created for each subscriber/service mapping.

| | |
|---|---|
| Subscriber Index: Unique | Service Index: Unique |
| Subscriber Name: For Information | Service Name: For Information |
| Connection Type: Dynamic or Permanent | Connection VC: VPI/VCI. Required only for the service reachable on ATM uplink port. |
| Status: Active, NotInService | Action: Connect, Disconnect |

The connection profile for a subscriber contains the following additional information: Connection Properties, Duration of Connection: Fail-over Service; Idle Time; Time to Live; Earliest Start; Latest Start; and Force Log-off Time.

A number of connection statistics may be maintained. These connection statistics may include, for example, the number of received cells and the number of transmitted cells.

CLI Commands

In one embodiment, the following CLI commands are used for creating, modifying and deleting a subscriber and a service. CLI application primitives that are supported for services and subscribers are:

| Command | Object |
|---|---|
| Add | Service, Subscriber, Service management reachability definition, Service reachabiltiy definition, Connection record, connection profile |
| Delete | Service, Subscriber, Service management reachability definition, Service reachabiltiy definition, Connection record, connection profile. |
| Modify | Service, Subscriber, Service management reachability definition, Service reachabiltiy definition, Connection Entry, connection profile. |
| Connect | Service and Subscriber, actually a set on Action Object of a connection entry, |
| Disconnect | Service and Subscriber, actually a set on a connection entry |
| Show | Service, Subscriber, Service management reachability definition, Service reachabiltiy definition, Connection record, connection profiles & Connection Statistics |

Internal SSA

Figure 5:
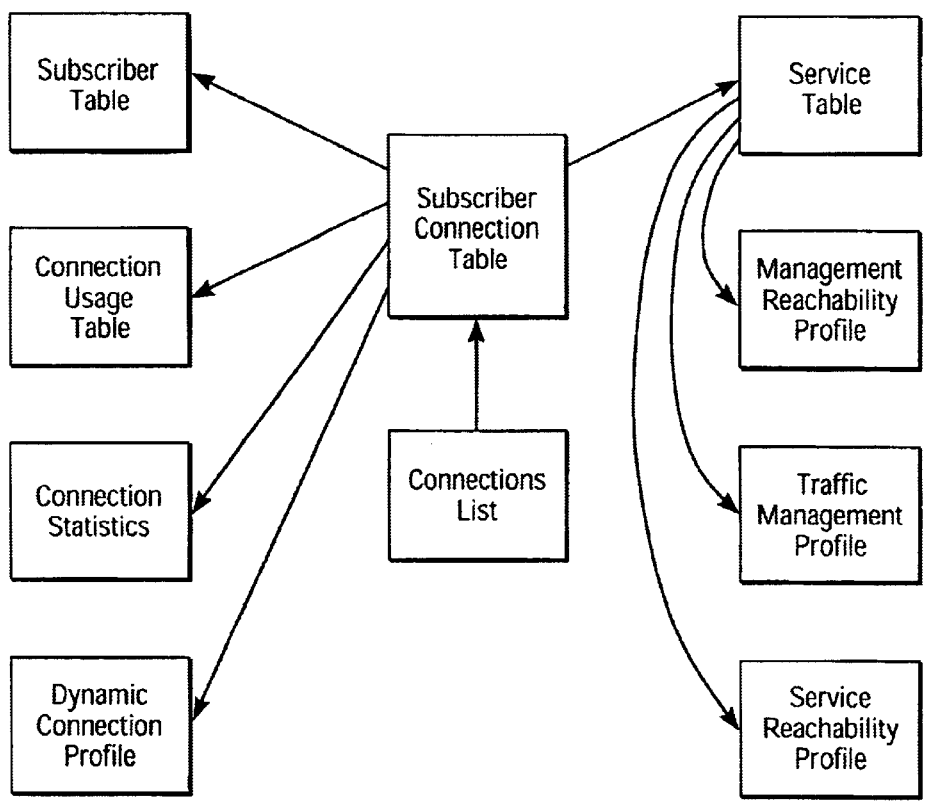
FIG. 5 illustrates an exemplary SSA data structure.

FIG. 5 illustrates an exemplary SSA data structure. The SSA supports management of the subscriber service and connection parameters through calls to the its method routines. In one embodiment, it contains a set of APIs functions to support permanent connection establishment and re-establishment, DSS establishment and DSS re-establishment, registration and communication pipe management.

Initialization Time

The SSA Initialization function (ssaInit( )) is called from the main system card initialization routine and performs the following functions:

Pipe Creation and Opening: create and open the communications pipes between the SSA and the Connection Manager (CM).

Database Initialization: register the databases with the Database manager and configure the RAM tables with the contents of the permanent storage area.

Task Creation: create a permanent connection task to handle connecting and re-connecting permanent connections. Same task brings up of the service management interfaces on uplink ports. Also there is a SSA event handler task to process the responses & indications coming from connection manager and CPE communications modules.

Registration

Registration refers to registering a call back with Connection Manager to receive port indications, registering a call back with CPE communications module to receive the responses & disconnect indications coming from CPE (data connection manager module on CPE), and registering the SSA's management information base (MIB, which contains managed objects for the SSA, with the SNMP agent stack. The latter allows SNMP managers to access the SSA objects via SNMP and allows the CLI to access the SSA's parameters.

Service Management Reachability Connections

The permanent connection task created at initialization is used to bring up management interfaces or permanent connection on-line to re-establish an existing connection. In this way, the system continually tries to keep service management interfaces active, only if the entry's status is set to active. If the entry's status is notInService, this indicates to the permanent connection task to skip this entry when initiating the connect or reconnects. In one embodiment, when a port up indication is received, the select function which is running with the ssaEventHandler task selects a port indication message and calls the ssaProcessPortInds function. This function scans the lists of service management interfaces and permanent connections looking for a match with the SSP. When one is found, it sets a flag to indicate that the SSP is up or down.

In the permanent connection task, the state of the SSP flag is examined and connect is issued.

Method Routines

The method routines are function to provide access to SSA and MIB objects for SNMP management.

The SSA maintains the subscriber definitions in non-volatile storage, opening and reading from or writing to the database in the CO whenever a request is made for subscriber objects.

In one embodiment, the service management reachability (interface) entries are configured in a linked list which is maintained in a DRAM, its copy is maintained in non-volatile storage and is kept in sync with the DRAM version. The same approach is taken with the service and connection entry. The connection statistics only ever exist in DRAM. At initialization time, the entire list of connection entries is processed and a permanent connection list created.

Control Data Flow

CPE

The subscriber and service definitions have no impact on the CPE until a connection request or service selection is made. The CPE is a fairly unintelligent device and its configuration is driven by the CO. Integrated Local Management Interface, ILMI, is used as the communications medium for configuration information between CO and CPE. In one embodiment, there is an ILMI element on the CPE and on the CO, on the system card. By default, ILMI uses VPI=0, VCI=16, as its virtual connection. This is created at initialization time on both the CO and CPE. A set of managed objects is defined under the control of ILMI (in addition to the ATM Interface objects which are part of the standard). These are the objects that are used to configure and control the CPE from the CO.

A separate virtual connection (VC), referred to as the pass through VC, is used to data flow between the JAVA applet on the CPE and the CO. The JAVA Applet is used for service selection. Thus, there are always 2 dedicated VC's between a CPE and a CO. Both these VC's terminate on the system card in the CO, since this is where the ILMI and JAVA server reside. The management VC is created at initialization time in a similar way to the ILMI VC. The dedicated management VC is VPI=0, VCI=36.

Connections

Connections definitions can be created through network management requests (SNMP or CLI). In most cases, where a single subscriber entry is defined to represent a business entity at the CPE side the manual approach will be taken. The connection will be established by setting the connection entry's Action object to Connect.

SSA API Functions

In one embodiment, the DSS component provides a JAVA application which subscriber can use to select a service and connect to the service. Internally, the DSS uses the SSA API functions to validate the subscriber, provide a subscriber with a list of offered/authorized services and support connection completion.

The subscriber is prompted for their name and the DSS searches for the named subscriber. If optional local authentication is in force, the subscriber is prompted for a password. When this local authentication completes, the subscriber is presented with a list of services. The subscriber selects the desired service.

The following functions are provided by one embodiment of the SSA to support this service selection:

ssaValidateSubscriber is called to verify that the subscriber has been configured.

ssaSscbrValidatePword is called to validate the subscriber's password if local authentication is enabled for the subscriber.

ssaGetCurrentServices is called to get a list of services the subscriber is currently using.

ssaGetConnectInfo is called to return the connection entry for this subscriber. This contains the connection information required to complete the connect request.

ssaConnect is called to initiate the connection procedure. This function in turn issues a request to XCM module through a write pipe.

ssaDisconnect is called to initiate the disconnect procedure.

ssaGetSscbrSSP is called by to get the subscriber port SSP for the given subscriber.

ssaGetSrvcSSP is called to get the uplink port on which give service is reachable.

ssaGetSrvcBWProfile is called to get the traffic management profile associated with the given service.

A set of API functions for use with subscriber to service connections for one embodiment are defined below:

ssaValidateSubscriber
Name:

Uint32 ssaValidateSubscriber(Uchar *sscbrName)
Parameters:

sscbrName - the subscriber's name string
Description:

Query the subscriber database using the subscriber name as the lookup key and determine if this is a valid (existing subscriber).
Returns:

OK - If this is a valid subscriber otherwise,
SSA_BAD_SSCBR or other error.
ssaSscbrValidatePword
Name:

Uint32 ssaSscbrValidatePword( Uchar *sscbrName,
Uchar *sscbrPword)
Parameters:

ssbcrName - the subscriber's name
sscbrPword - the subscriber's password, as entered by the subscriber tying to connect.
Description:

Query the subscriber database for the subscriber's entry. Compare the passed password string with the one in the database record, if they match, return OK.
Returns:

OK - if the password is valid otherwise
SSA_BAD_SSCBR - The subscriber couldn't be found
SSA_BAD_PWORD - The passwords is incorrect.
ssaGetCurrentServices
Name:

Uint32 ssaGetCurrentServices( Uchar *sscbrName,
SSA_authList **pAuthList)

-continued

Parameters:

ssbcrName - the subscriber's name
pAuthList - a pointer to the list of services that this subscriber is authorized to connect to.
Description:

This function searches the connection database looking for matches on the passed subscriber. If a match is found, a new entry is added to the authorization list being returned. This list contains the service name and the state of the service and also indicates if the subscriber has currently selected the service. Memory for *pAuthList pointer is alloted by SSA process. This should be freed up DSS process after it has finished processing the passed information.
Returns:

A pointer to the list of authorized entries and OK or one of the following error codes.
SSA_BAD_SSBR, SSA_BAS_SRVCS - As defined above.
SSA_NO_MEM - Some memory problem occurred, this is pretty serious, it means memory couldn't be allocated for database queries or for the returned list.
SSA_NO_AUTH_SRVCS - There are no authorized services for this subscriber.
ssaGetConnectInfo
  NAME:

Uint32 ssaGetConnectInfo( Uchar    *sscbrName,
             Uchar    *srvcName,
             ANI_SSP   sscbrSSP,
             SSA_connConfigEntry **pConnEntry,
             Uint32   *pAuthType,
             SSA_srvcMREntry   *psrvcMgmtprofile)
  Parameters:

sscbrName - the subscriber's name
srvcName the name of the service
sscbrSSP - the exact physical location of the subscriber
pConnEntry - a pointer to the returned connection entry
pAuthType - pointer to the returned authentication type
pSrvcMgmtProfile - a pointer to the returned service management profile
Description:

This function returns a pointer to this connection table entry and the service entry from the passed names.
This function does not do the actual connecting, but returns the appropriate information to the caller so that the caller can pass this information in ssaConnect() call.
Returns:

OK if everything went fine, otherwise,
SSA_BAD_SSCBR - the subscriber passed doesn't exist
SSA_BAD_SRVC - the service doesn't exits
SSA_FAIL_DB_SET - a database entry couldn't be set
SSA_NO_MEM - the function couldn't allocate any memory for the new connection entry.
SSA_NO_CONNECTION - the entry couldn't be added to the list of connection entries.
SSA_FAIL - some other failure occurred (one of the calls to connection manager API functions returned and error).
ssaConnect
  Name:

Uint32 ssaConnect(SSA connConfigEntry *pConn,
             int resp_fd,
             Uint32 *seq_num))
  Parameters:

pConn - pointer to the connection record. This pointer was obtained by DSS process using ssaGetConnectInfo() call.
resp_fd - pipe descriptor on which DSS wishes to get the response back.
seq_num - pomter to the returned sequence number. Same sequence number is returned to the DSS in the response message later.
Description:

Issue a connect request for the given connection record.

-continued

Returns:

OK - If the connect request could be issued.
SSA_SSCBR_NOTACTIVE - if the subscriber is not in "active"State.
SSA_SRVC_NOTACTIVE - if the service is not in active state.
SSA_NO_SRVC_REACH - if the given service has no reachability information configured.
SSA_SRVC_REACH_INACTIVE - if the service reachability definition in not in "active" state.
Or Other Error.
ssaMgmtDisconnect
  Name
  Uint32 ssaMgmtDisconnect(SSA_connConfigEntry *pConn, int resp_fd, Uint32 *seq_num)
  Parameters:

pConn - pointer to the connection record. This pointer was obtained by DSS process using ssaGetConnectInfo() call.
resp_fd - pipe descriptor on which DSS wishes to get the response back for this request.
seq_num - pointer to the returned sequence number. Same sequence number is returned to the DSS in the response message later.
Description:

Issue a disconnect request for the given connection.
Returns:

OK - If the disconnect request could be issued.
SSA_CONN_INVALID_STATE - if the connection is not in "connected" state
Or Other Error.
ssaGetSscbrInfo
  Name
  STATUS SsaGetSscbrInfo(Uint32 sscbrIndex, ANI_SSP *ssp,
             Uint8
             *sscrName[MAX_sscbrName])
  Parameters:

sscbrIndex - index to the subscriber record.
Ssp - pointer to the returned subscriber port ssp(shelf,slot, port)
SscbrName - pointer to the returned subscriber name.
Description:

Get the subscriber side port number and subscriber name from given subscriber index. The call is used by Gatekeeper module.
OK - if matching subscriber is found and is in active state.
SSA_BAD_SSCBR- if the subscriber does not exist
SSA_SSCBR_NOTACTIVE- is in state other than "active".
ssaGetSrvcInfo
  Name
  STATUS SsaGetSrvcInfo(Uint32 srvcIndex, ANI_SSP *ssp,
             Uint8
             srvcName[MAX_srvcName)
  Parameters:

srvcIndex - index to the service record.
Ssp - pointer to the returned port ssp(shelf,slot, port) on which given service is reachable
SrvcName - pointer to the returned service name.
Description:

Get the service name & uplink port number on which given service is reachable. The call is used by Gatekeeper module.
OK - if matching service is found and is in active state and has a data reachability definition associated with it.
SSA_SRVC_MISSING - if the service does not exist
SSA_SRVC_NOTACTIVE- if the service is not in active state.
SSA_NO_SRVC_REACH - there is no reachability entry configured for the given service
SSA_SRVC_REACH_INACTIVE - the service reachability entry for the given service is not in active state
ssaGetSrvcBWProfile
  Name
  STATUS SsaGetSrvcBWProfile(Uint32 srvcIndex, Uint32 *profilePtr)

-continued

Parameters:

SrvcIndex - index to the service record.
ProfilePtr - pointer to the returned profile index.
Description:

Get the index to the traffic management profile associated with the given service.

Functions for SSA

The SSA uses a connection manager service in the system to establish and remove connections.

Connection Establishment & Termination

The Connection Manager passes connection information to the CPE. The connection manager creates a connection entry table with a separate entry for each connection. This table is indexed on a unique connection identifier and can be used to show the state of connections and to disconnect a subscriber from a service. This unique connection ID allows support of more than one connection from a given subscriber. The connection ID is also configured on the CPE. When the CPE detects a connection timeout or idleness, it signals the CO to disconnect the subscriber, where the connection ID identifies which connection to terminate.

Figure 6:
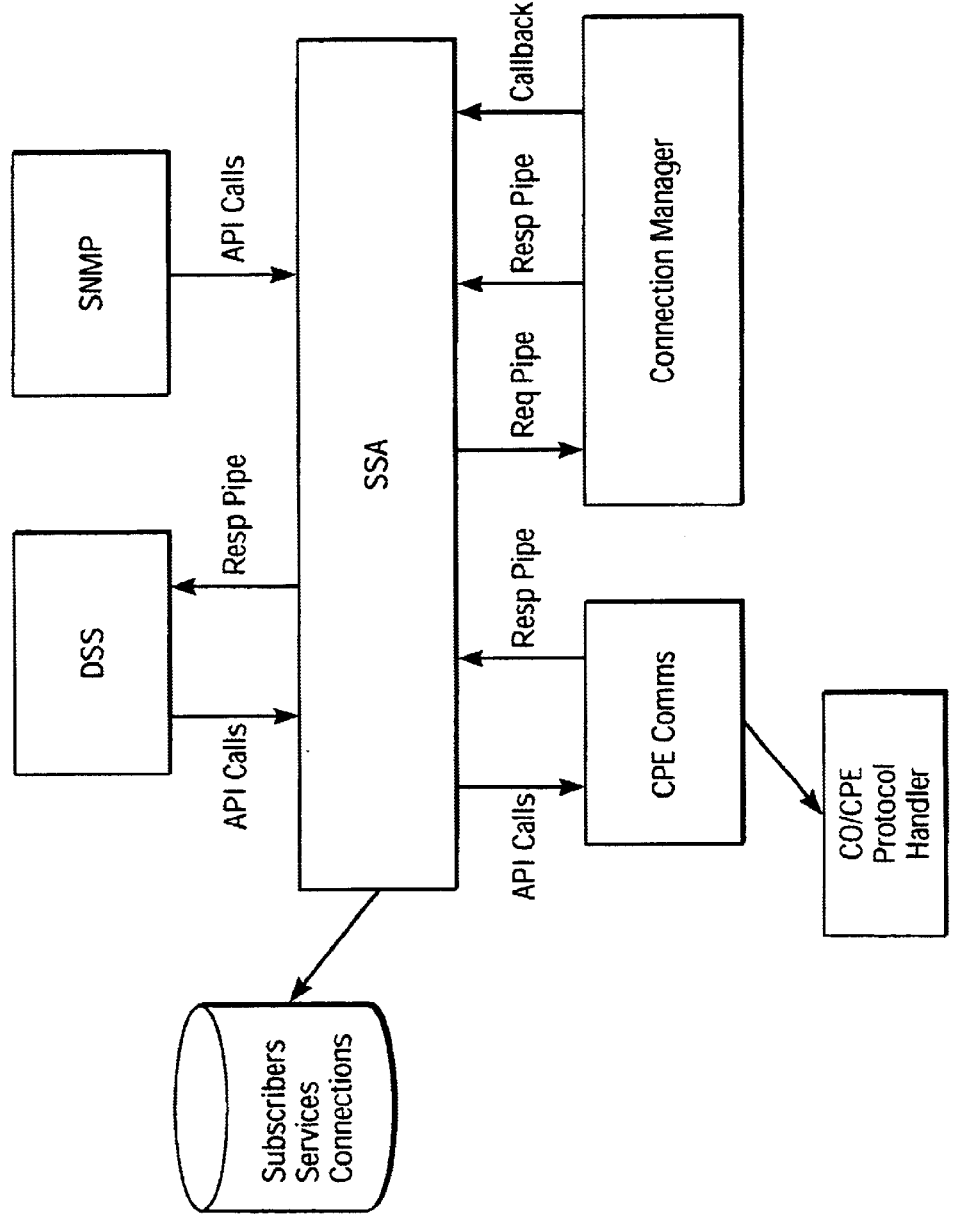
FIG. 6 illustrates interactions between various modules in a connection establishment phase.

FIG. 6 illustrates the interactions between various modules in a connection establishment phase. Referring to FIG. 6, a database containing the subscribers, services and connections is accessed by the SSA. The SSA may access the database in response to a request from the DSS block application via an API call or a request from an SNMP block. The SSA makes requests to CPE communications block and the connection manager in the CO, which provides responses via response pipes. The CPE communications block and the data connection manager on the CPE provide requests to the CO/CPE protocol handler. Each of these blocks may be implemented in software, hardware or a combination of both.

An Exemplary Computer System

Figure 4:
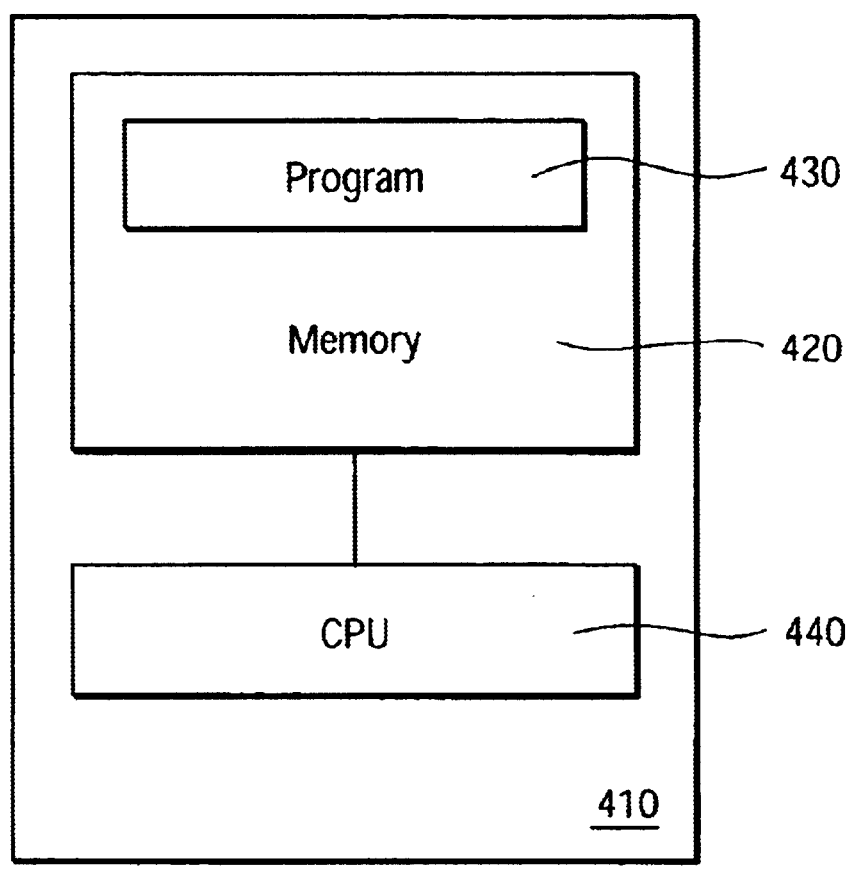
FIG. 4 illustrates a general purpose computer executing a software program stored in a memory.

One or more functions described herein may be implemented as software programs stored in a computer readable medium, such as program 430 stored in a computer readable medium 420 as shown in FIG. 4. The programs may be performed by a general purpose computer 410, which reads the program 430 from the memory 420 and executes the program 430 using processor 440.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method of a workstation in a local area network (LAN) for accessing a wide area network (WAN), the method comprising:

receiving a request to select a network service provider (NSP) from a workstation, the request using a first IP address of the workstation assigned by a customer premise equipment (CPE) located on premises of a customer having one or more workstations coupled to the CPE;

presenting, in response to the request via a Web server capable of serving requests from the first IP address, a list of at least one NSP to a user of the workstation;

selecting by the user at a Web page maintained by the Web server at least one NSP from the list independently from other workstations of the LAN, wherein the selection of the at least one NSP is maintained by a central office (CO) communicatively coupled to the CPE and one or more NSPs of the list over a network;

switching the workstation's IP address from the first IP address to a second IP address assigned by the selected at least one NSP without rebooting the workstation; and thereafter accessing the WAN through the selected at least one NSP using the second IP address, wherein requests for accessing the WAN are routed to the selected at least one NSP by the CO based on the NSP selection information maintained by the CO.

2. The method of claim 1, further comprising:

receiving at the CPE a request for the first IP address during an initialization of the workstation; and assigning the first IP address to the workstation in response to the request, the first IP address being issued from a DHCP server within the CPE.

3. The method of claim 1, further comprising:

establishing a connection from the CO to the selected at least one NSP to request the second IP address from the selected at least one NSP, in response to the selection of the at least one NSP;

receiving the second IP address from the selected at least one NSP; and forwarding the second IP address to the CPE which in turn assigns the second IP address to the workstation over the network.

4. The method of claim 1, wherein the selected at least one NSP includes a first NSP and a second NSP, and the method further comprises:

directing a portion of a network traffic associated with the workstation to the first NSP; and simultaneously directing a remainder of the network traffic to the second NSP.

5. The method of claim 4, further comprises:

directing a first portion of the network traffic having a first network protocol to the first NSP; and simultaneously directing a second portion of the network traffic having a second network protocol to the second NSP.

6. The method of claim 4, further comprises:

directing a first portion of the network traffic associated with a first application to the first NSP; and simultaneously directing a second portion of the network traffic associated with a second application to the second NSP.

7. The method of claim 1, further comprising creating a virtual connection between the workstation and each of the selected at least one NSP to handle network traffic between the workstation and each of the selected at least one NSP simultaneously and independently.

8. An article of manufacture comprising a computer readable medium having computer readable code stored thereon, which, when executed by a system, causes the system to:

receive a request to select a network service provider (NSP) from a workstation, the request using a first IP address of the workstation assigned by a customer premise equipment (CPE) located on premises of a customer having one or more workstations coupled to the CPE;

present, in response to the request via a Web server capable of serving requests from the first IP address, a list of at least one NSP to a user of the workstation;

select by the user at a Web page maintained by the Web server at least one NSP from the list independently from other workstations of the LAN, wherein the selection of the at least one NSP is maintained by a central office (CO) communicatively coupled to the CPE and one or more NSPs of the list over a network;

switch the workstation's IP address from the first IP address to a second IP address assigned by the selected at least one NSP without rebooting the workstation; and thereafter access the WAN through the selected at least one NSP using the second IP address, wherein requests for accessing the WAN are routed to the selected at least one NSP by the CO based on the NSP selection information maintained by the CO.

9. The article of claim 8, further comprising computer readable code for:

receiving at the CPE a request for the first IP address during an initialization of the workstation; and assigning the first IP address to the workstation in response to the request, the first IP address being issued from a DHCP server within the CPE.

10. The article of claim 8, further comprising computer readable code for:

establishing a connection from the CO to the selected at least one NSP to request the second IP address from the selected at least one NSP, in response to the selection of the at least one NSP;

receiving the second IP address from the selected at least one NSP; and forwarding the second IP address to the CPE which in turn assigns the second IP address to the workstation over the network.

11. The article of claim 8, wherein the selected at least one NSP includes a first NSP and a second NSP, the article further comprises:

computer readable code for directing a portion of a network traffic associated with the workstation to the first NSP; and computer readable code for simultaneously directing a remainder of the network traffic to the second NSP.

12. The article of claim 11, further comprises:

computer readable code for directing a first portion of the network traffic having a first network protocol to the first NSP; and computer readable code for simultaneously directing a second portion of the network traffic having a second network protocol to the second NSP.

13. The article of claim 11, further comprises:

computer readable code for directing a first portion of the network traffic associated with a first application to the first NSP; and computer readable code for simultaneously directing a second portion of the network traffic associated with a second application to the second NSP.

14. The article of claim 8, further comprising computer readable code for creating a virtual connection between the workstation and each of the selected at least one NSP to handle network traffic between the workstation and each of the selected at least one NSP simultaneously and independently.

15. An apparatus of a workstation in a local area network (LAN) for accessing a wide area network (WAN), the apparatus comprising:

means for receiving a request to select a network service provider (NSP) from a workstation, the request using a first IP address of the workstation assigned by a customer premise equipment (CPE) located on premises of a customer having one or more workstations coupled to the CPE;

means for presenting, in response to the request via a Web server capable of serving requests from the first IP address, a list of at least one NSP to a user of the workstation;

means for selecting by the user at a Web page maintained by the Web server at least one NSP from the list independently from other workstations of the LAN, wherein the selection of the at least one NSP is maintained by a central office (CO) communicatively coupled to the CPE and one or more NSPs of the list over a network;

means for switching the workstation's IP address from the first IP address to a second IP address assigned by the selected at least one NSP without rebooting the workstation; and thereafter means for accessing the WAN through the selected at least one NSP using the second IP address, wherein requests for accessing the WAN are routed to the selected at least one NSP by the CO based on the NSP selection information maintained by the CO.

16. The apparatus of claim 15, wherein the selected at least one NSP includes a first NSP and a second NSP, and the apparatus further comprises:

means for directing a portion of a network traffic associated with the workstation to the first NSP; and means for simultaneously directing a remainder of the network traffic to the second NSP.

17. The apparatus of claim 16, further comprises:

means for directing a first portion of the network traffic having a first network protocol to the first NSP; and means for simultaneously directing a second portion of the network traffic having a second network protocol to the second NSP.

18. The apparatus of claim 16, further comprises:

means for directing a first portion of the network traffic associated with a first application to the first NSP; and means for simultaneously directing a second portion of the network traffic associated with a second application to the second NSP.

19. The apparatus of claim 15, further comprising means for creating a virtual connection between the workstation and each of the selected at least one NSP to handle network traffic between the workstation and each of the selected at least one NSP simultaneously and independently.

20. The apparatus of claim 15, wherein the selected at least one NSP is different from NSPs selected by the other workstations of the LAN.

* * * * *